United States Patent [19]
Dugast et al.

[11] Patent Number: 5,628,810
[45] Date of Patent: May 13, 1997

[54] METHOD AND COMPOSITION FOR INCREASING THE PROTEIN CONTENT OF GRAINS

[75] Inventors: Philippe Dugast, Verneuil S/ Seine; Jacques Decroux, Ramonville St. Agne, both of France

[73] Assignee: Grande-Paroisse S.A., Puteaux, France

[21] Appl. No.: 504,270

[22] Filed: Jul. 19, 1995

[30] Foreign Application Priority Data

Jul. 21, 1994 [FR] France ................................. 94 09022

[51] Int. Cl.$^6$ ........................................... C05C 9/00
[52] U.S. Cl. ........................ 71/28; 71/30; 426/302; 426/309; 504/327; 47/58
[58] Field of Search .............................. 426/302, 309; 504/116, 327; 71/16, 25, 28, 30; 47/58; 514/23, 54, 55, 57

[56] References Cited

U.S. PATENT DOCUMENTS

| | | | |
|---|---|---|---|
| 2,644,806 | 7/1953 | Kise | 71/28 X |
| 3,063,839 | 11/1962 | Simonet et al. | 504/327 X |
| 3,087,806 | 4/1963 | Martin | 504/327 X |
| 4,328,024 | 5/1982 | Orth, Jr. | 71/16 X |

FOREIGN PATENT DOCUMENTS

| | | |
|---|---|---|
| 0075508A1 | 3/1983 | European Pat. Off. |
| WO93/09072 | 5/1993 | WIPO |

OTHER PUBLICATIONS

Katakura Chikkarin, "Database WPI," AN 89–320708 (1989).
Tagi Chem, "Database WPI," AN 76–91739X (1976).
Takahashi et al., "Chemical Abstracts," 118:21674t (1992).

Primary Examiner—Milton Cano
Attorney, Agent, or Firm—Pennie & Edmonds

[57] ABSTRACT

The present invention describes a protein guarantor composition and its application, in particular to improving the protein content of cereals. The protein guarantor composition containing urea as nitrogen source and incorporating deacylated chitin proves noteworthy, by virtue of the increase in the protein content of the grain. This composition does not cause harmful scorching of the foliage and its apparent use coefficient for nitrogen is much better than that of the nitrogen fertilizers applied to the soil.

8 Claims, 1 Drawing Sheet

FIG. 1

☐ only urea
▨ Chitosan
▥ Saccharose
▨ Inulin
▤ Ammonium nitrate

METHOD AND COMPOSITION FOR INCREASING THE PROTEIN CONTENT OF GRAINS

FIELD OF THE INVENTION

The present invention relates to the use of a protein guarantor for leaf treatment of vegetation, for the purposes of increasing the protein content of crops and more particularly of wheats.

BACKGROUND OF THE INVENTION

Wheats are commonly classified, according to varieties and their natural tendency and according to the protein content of the grain, into soft wheats and hard wheats. Soft wheats are divided into fodder wheats, which are unsuitable for bread-making, wheats which are suitable for bread-making (12% minimum of proteins), and wheats of first-class quality or improved wheats (13.5% minimum of proteins).

Hard wheats are characterized by a 14.5% minimum of proteins.

The baking quality of wheats is closely related to the variety but also to highly significant external factors such as "the year effect" and the nitrogen fertilization, so that farmers are never assured of seeing their batch of cereals accepted for such or such a use.

The yield to the hectare of a cereal field is a matter of fertilization of the soil. It is, moreover, known that nitrogen fertilization of wheat crops is reflected by an increase in the protein content of the grain. It is known, for example in Champagne, a region of France where yields are generally high and protein richness low, that a supplement of 80 nitrogen units supplied to the soil increases the protein content by approximately 1%. This is assessed by the apparent use coefficient (AUC) of the nitrogen which is calculated by the formula $$AUC\% = \frac{\Delta N \text{ absorbed}}{\Delta N \text{ applied}} \times 100$$

wherein $\Delta N$ is the difference in nitrogen between an unfertilized control and the sample originating from a fertilized plot at a given dose or the difference between samples originating from two plots which have been fertilized in different ways, or alternatively $$AUC\% = \frac{\frac{\Delta \text{ proteins }\%}{5.70} \times \text{Yield (g/ha)}}{\text{dose } N \text{ applied (kg/ha)}} \times 100$$

For an application, in fertilization, of ammonium nitrate to the soil at the "ear swelling" stage at a dose of 40 kg N/ha, the AUC is of the order of 50% to 60%. The AUC becomes better as the nitrogen application to the soil is made later (for example, by application at the stage of swelling of the ear), provided, however, that the application is followed by rain, which is not always the case, and, in any event, the AUC thus obtained reaches 80% at the very most.

SUMMARY OF THE INVENTION

It has now been found that it is possible to substantially raise the protein content of wheats by application of a protein guarantor, an aqueous composition based on urea with deacylated chitin included in the formulation. The application of such a composition, under conditions specified hereinbelow, has the result of increasing, to an unexpected degree, the protein content of the wheat treated, while using a smaller amount of nitrogen than that which would have been conventionally applied to the soil and virtually without harmful scorching of the foliage as is very frequently produced thereby during the use of ordinary liquid nitrogen fertilizers applied at a late stage (from the "two nodes" stage of the wheat). The improvement thus obtained is reflected by a very high, greater even than 100%, apparent use coefficient (AUC) of nitrogen. This remarkable and unexpected performance reflects not only a commonplace nutritional role of the formulation but an unexplained physiological role. Moreover, such a treatment does not lead to an increase in the amount of nitrogen left in the soil after harvesting, a risk which can be incurred during the late use of a nitrogen fertilizer applied to the soil, very particularly when weather conditions are not favorable to its effectiveness.

DESCRIPTION OF THE PREFERRED EMBODIMENTS

Figure 1:
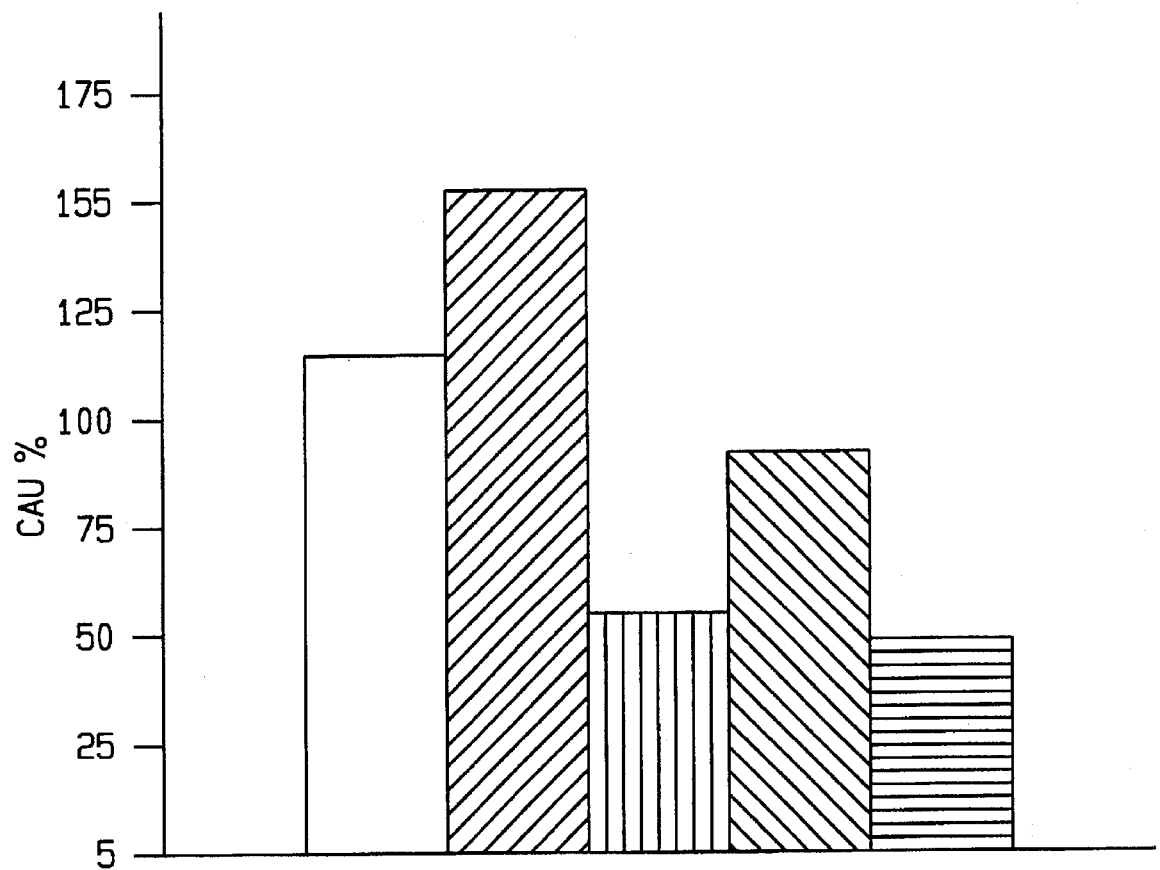
FIG. 1 graphically compares the AUC % achieved with a composition of the present invention to those achieved with various other compositions, as detailed in Example 2.

The present invention provides a composition for increasing the protein content of grains. The composition consists of a neutral aqueous mixture comprising urea in the proportion of 150 to 220 grams of nitrogen per liter and chitosan in the proportion of 0.2 to 10 grams per liter. The aqueous mixture may further comprise 0.05 to 0.2 grams per liter of $Ni^{2+}$ ions.

The present invention also provides a process for improving the protein content of a cereal crop, which process comprises spraying onto the foliage a protein guarantor composition as described. The spraying is conducted at a period in the growth cycle of said cereal selected from the periods ranging from the end of swelling of the ear stage to the flowering stage.

The nitrogen base stock of the protein guarantor according to the invention is urea, a product which is relatively nonionic with a low osmotic pressure per unit of dissolved nitrogen, in comparison with ammonium nitrate, another common source of agricultural nitrogen. Urea, for this use, should contain only a very small amount of biuret, the latter product being phytotoxic. For this reason, use is made, as starting material, of hot urea solutions, preferably containing granulated urea, in order to thus ensure that the biuret content is less than 0.3%. Urea solutions which are suitable assay on the order of magnitude of 200 grams of nitrogen per liter, which translates to approximately 435 grams of urea per liter.

As the basicity of the solution, arising from a certain amount of free ammonia, is unfavorable to penetration of the nitrogen through the leaves, the pH of the above solution is brought to approximately 7 by addition of an acid which is acceptable in the compositions for leaf treatments. This acid can be, for example, nitric acid, sulfuric acid, phosphoric acid, or acetic acid. Preference is given to nitric acid, which presents few risks of causing precipitations in the composition and whose nitrogen can be assimilated by the foliage. It will be used for the most part as a decinormal solution, in an amount which can vary with the batch of urea used, 80 ml of decinormal nitric acid per liter being an average order of magnitude.

Assimilation of the nitrogen may be facilitated by adding, to this base solution, 0.1 g per liter of nickel, in the form of $Ni^{2+}$ ions, which is a cofactor of urease. Generally, on the order of 0.4 grams per liter of, for instance, nickel chloride hexahydrate may be used.

This technique for the protein guarantor is distinguished from that of the liquid fertilizers with which it might be tempting to compare it. It is distinguished first by the time of the treatment, since it takes place after the number of grains of the ear is fixed and after the yield of the crop is virtually established. It is next distinguished by its method of implementation, since in the method for the liquid fertilizers used post-emergence, the emphasis is on forming large drops in order for them to roll over the foliage and not lie there. In the present invention, in contrast, the emphasis is on retaining the solution on the leaf, as in crop protection treatments, but with the difference from the latter that the treatment is carried out with concentrated solutions due to the amount of active elements to be supplied. Experience has shown that the adjuvants commonly used in the formulation of leaf plant-protection products, such as ethoxylated sorbitan laurate or oleate (Montanox®), were sources of severe scorching of the foliage, in particular the widely used Montanox.

In this role of adjuvant, deacylated chitin, a poly-2-deoxy-2-aminoglucose catalogued in the Chemical Abstracts Registry under the number 9012-76-4, is an essential means of the present invention, because it combines all the physical qualities demanded for such an adjuvant and because the protein guarantor with which it is formulated both leads to an unexpected AUC and does not scorch the foliage in a harmful way. It is marketed under the name of chitosan for various medical or pharmaceutical uses or alternatively as a component in the preparation of films or filaments, as a primer, or as an ingredient in the formulation of drilling muds.

The formulations which are useful for the invention are thus aqueous compositions with a pH in the region of 7 whose urea content, expressed as nitrogen, is between 150 and 220 grams of nitrogen per liter and which assay between 0.2 and 10 grams of chitosan per liter of protein guarantor. The solutions containing approximately 0.5 gram per liter are preferred. They are readily prepared, for example from solutions containing 2.5% of chitosan, which are prepared by dispersing 37.5 g of the product in its standard commercial form in 1 liter of water. The dispersion is left in this way for 2 to 3 hours, is then stirred, and 250 ml of 1N nitric acid are incorporated. After complete dissolution, the solution is completed to 1.5 liters with water. Such a solution is simply blended with the above urea nitrogen solution in order to prepare the protein guarantor of the invention. It is possible, as indicated above, to improve it further by the optional addition of a nickel salt, in the proportion of 0.05 to 0.2 g of nickel per liter.

The protein guarantor is used at the dose of approximately 100 liters per hectare, as a fine spray (as in plant-protection treatments), from the end of "swelling of the ear" stage to the flowering stage.

This protein guarantor according to the invention displays particularly advantageous and unexpected properties with respect to wheat. It is highly valued for guaranteeing a better baking value for flours obtained from varieties of wheat which sometimes yield wheat at the limit of 12% of proteins, such as the wheats Thésée, Forby, Récital, Apollo, Rossini, or Sidéral. It is understood that these indications do not rule out its application to raising the protein content of other soft or hard wheats or of other cereals such as maize, sorghum, barley, oats, rye, or triticale and that this composition is also useful for their fertilization, as well as for that of other crops, in particular sunflower, rapeseed, soya, sugar beet, or potato or alternatively of fodder or meadow varieties.

EXAMPLES

The following examples will make the invention better understood.

Example 1

Scorch Test on Foliage

Two tests carried out on soft wheat (variety Forby) are recounted here, in which tests the scorch effects of various formulations based on urea assaying 20% by weight of nitrogen and applied in the proportion of 100 liters to the hectare were recorded. The scorches at the end of the last leaf are visually observed. The grades indicated below are the result of a number of gradings each carried out in a different order.

| Type of solution | 1st test | 2nd test |
| --- | --- | --- |
| Urea alone | 9 | 6 |
| Urea + 0.05% chitosan | 6 | 4.5 |
| Urea + 2.5% sucrose | 8 | no test |
| Urea + 3.5% inulin | 5 | 4 |
| Urea + 0.4% Montanox | no test | 9 |

As the results reported in the above table demonstrate, the solutions containing chitosan are among the least aggressive.

Example 2

Protein Content of the Ear

The results presented in the table below and illustrated by FIG. 1 were obtained on a plot of soft wheat which is fertilized in the normal way. They make it possible to compare the additional application of 40 kg N/ha in the form of ammonium nitrate applied to the soil at the stage of swelling of the ear with the application of 20 kg N/ha by the leaf route at the same vegetative stage in the form of variously formulated urea solutions. The control corresponds to ordinary agricultural fertilization, without additional application of nitrogen.

| Treatment | Protein content of the grain (%) | AUC % |
| --- | --- | --- |
| Control | 11.3 | — |
| Urea alone | 13.0 | 114 |
| Urea + 0.05% chitosan | 13.6 | 152 |
| Urea + 2.5% sucrose | 12.1 | 55 |
| Urea + 2.5% inulin | 12.7 | 92 |
| Ammonium nitrate to the soil | 12.8 | 49 |

In the present case, where ordinary fertilization does not make it possible to obtain a wheat classified as "suitable for bread-making" since its protein content is less than 12%, the formulation of the "protein guarantor" according to the invention is that which leads to the best protein content of the grain with an AUC with an unexpected high value.

The present invention having been fully described and having been illustrated with reference to specific embodiments thereof, those skilled in the art will readily conceive of alternate embodiments thereof, and all such alternative embodiments of the present invention covered by the appended claims are likewise the subject of this patent.

What is claimed is:

1. A composition for increasing the protein content of grains, said composition consisting of a neutral aqueous mixture comprising urea in the proportion of 150 to 220 grams of nitrogen per liter and chitosan in the proportion of 0.2 to 10 grams per liter.

2. The composition of claim 1, wherein said aqueous mixture is neutralized with nitric acid to a pH of 7.

3. The composition of claim 1, wherein said aqueous mixture further comprises 0.05 to 0.2 grams per liter of $Ni^{2+}$ ions.

4. A process for improving the protein content of a cereal crop, which process comprises spraying onto the foliage a protein guarantor composition consisting of a neutral aqueous mixture comprising urea in the proportion of 150 to 220 grams of nitrogen per liter and chitosan in the proportion of 0.2 to 10 grams per liter, wherein said spraying is conducted at a period in the growth cycle of said cereal selected from the periods ranging from the end of swelling of the ear stage to the flowering stage.

5. The process of claim 4, wherein said aqueous mixture is neutralized with nitric acid to a pH of 7.

6. The process of claim 4, wherein said aqueous mixture further comprises 0.05 to 0.2 grams per liter of $Ni^{2+}$ ions.

7. The process of claim 4, wherein said cereal crop is selected from the group consisting of soft wheats, hard wheat, maize, sorghum, barley, oats, rye, and triticale.

8. The process of claim 7, wherein said cereal crop comprises a soft wheat selected from the group consisting of fodder wheats, wheats which are suitable for breadmaking, and wheats of first-class quality.

* * * * *